Oct. 4, 1932.     J. F. KRIEGE ET AL     1,881,368
HAND CORN HUSKING DEVICE
Filed April 3, 1928
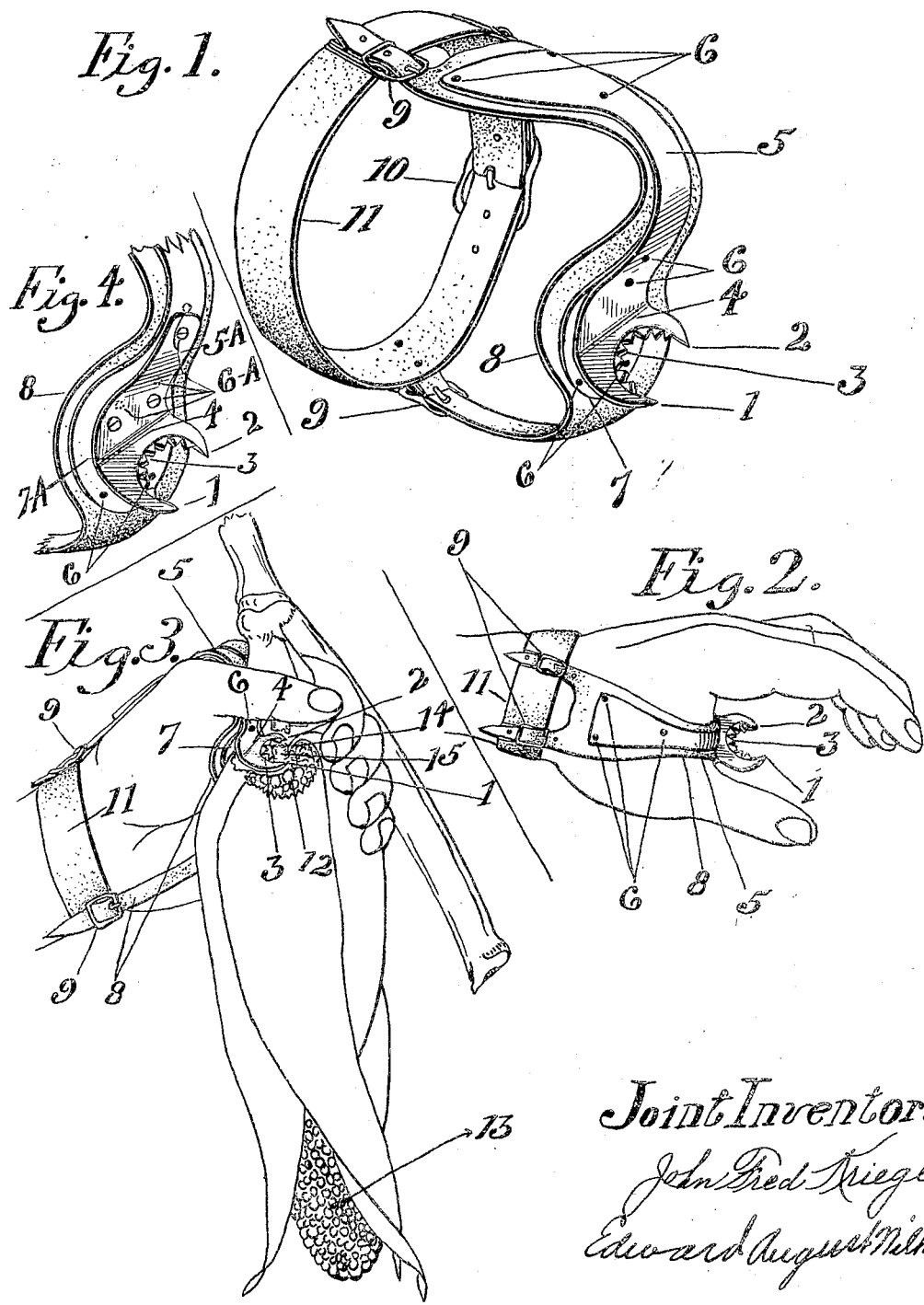
Joint Inventors.
John Fred Kriege
Edward August Nilken Patented Oct. 4, 1932

1,881,368

UNITED STATES PATENT OFFICE

JOHN FRED KRIEGE AND EDWARD AUGUST WILKINS, OF SOUTH SIOUX CITY, NEBRASKA

HAND CORN HUSKING DEVICE

Application filed April 3, 1928. Serial No. 266,966.

Our invention relates to a hand cornhusking device to be used primarily on the hand opposite the hand on which the corn husker wears a hook, peg or other device to tear open the husk. The acting part of our device is preferably somewhat U shaped, whose immediate base is cushioned on the forepart of the ball of the thumb; said acting part or preferred prong structure, points generally forward toward the middle fingers of the user. The primary object of our invention can best be explained by a description of its use, as follows: In use the prongs are inserted thru the husk, one on each side of the shank fastened to the ear of corn, between the base of the husk and the base of the shank, close up on the butt of the ear. The shank and husk are thus held firmly by the device, while the ear, thru an incision made in the husk toward the tip of the ear, with a hook or other device on the other hand, is preferably slightly twisted and pried loose against the device, and with the same motion thrown in the wagon. The ultimate objects of our invention are; first, to relieve the strain on both wrists, the fingers and thumbs of the husker; second, to cut down the number of motions and the length of the motions formerly required in removing each individual ear; third, to husk tough breaking corn practically as readily as easily husked corn, without fumbling dogging or change of method, that is by direct positive motions; fourth, to husk cleaner, faster and easier.

We prefer to attain these objects by the device illustrated in the accompanying drawing, in which—

Figure 1 is a perspective view of the device, with the prongs and long shank of one piece construction; Fig. 2 is an upper perspective view of the device as worn on the left hand; Fig. 3 is a perspective side view of the device as worn on the left hand and showing our preferred way of applying the device to the husk and shank of an ear of corn; Fig. 4 is a perspective view of the prongs with a short shank fastened to a section of the balance of the device.

Since most huskers are right handed in throwing the ear, and our device is primarily worn on the opposite hand, for the purpose of clearness, our device is illustrated and described as worn on the left hand, of course it can be made for either hand.

We would not be understood as being limited to the exact detailed construction and minor arrangement of the parts of our invention, as illustrated in the drawing and hereinafter described; for various alterations and modifications could be made in same as shown, without departing from the spirit and scope of the invention, as defined in the appended claim; for instance, the proportionate size or length of parts as compared to other parts of the device or even in the same part, as the proportionate length of the prongs to each other, or each respectively to the serrations between them, could be varied.

Similar numerals refer to similar parts throughout the several views.

The device consists of a metal part 5, Figs. 1, 2 and 3; the shank of said metal part 5, narrows down where it passes between the thumb and forefinger; the shank of 5, widens again under the thumb, see Figs. 1 and 3; as the said shank of 5, reaches the middle of the hand, forward of the ball of the thumb, it is bent as at 4, terminating in,—the clawlike prongs 1 and 2, with the teeth 3, on their common rounded inner edge, see Figs. 1, 2, 3, and 4. The said prongs 1 and 2, lie practically in the same plane, with prong 2, near the palm of the hand, and the prong 1, farther out under the thumb when in use; the said prongs 1 and 2, point generally forward, toward the middle fingers of the partially closed hand. The prongs 1 and 2, toward their respective points, are curved on their respective outer edges and the said points thus brought somewhat inward toward each other on a line with their respective inner edges, see Fig. 2; this is done to prevent the said points of 1 and 2, piercing the fingers when the hand is closed; the prongs 1 and 2, from their extremities are sharpened along their respective inner edges, well back over the teeth 3, Figs. 1 and 2. Prong 1 is longer than prong 2, see Fig. 2, because, first,—the prongs penetrate easier one at a time; second,—the ear is generally pried loose in contact with prong 1; third,—this is important, prong 1, being longest, allows it to be used in addition to its primary purpose, as hereinbefore generally set forth, to tear open the husk, exposing the ear, the same work done by a hook or other device, known to the art, but by a reversed movement, without interference from prong 2.

A plate of metal or pad of the leather or like material or combination with the metal on the outside, 7, Figs. 1 and 3, is fastened with rivets 6, or similar fasteners, to the shank of 5, Fig. 1; the combined plate and shank 7, extends from a point slightly above rivets 6, just above the immediate base of the prongs 1 and 2, to a point well under the said immediate base of said prongs, but still resting on the ball of the thumb; said plate 7, thus forming a shoulder and cushion under and around the shank of 5, back of prongs 1 and 2, and plate 7, thus projecting under the thumb, Fig. 3.

The metal or leather part or combination of the same 7, and the metal part 5, terminating in the prongs 1 and 2, are fastened with the said same rivets 6, Fig. 1, to leather or like material 8; leather 8, is wider than either 5 and 7, and acts as a direct cushion between the hand and 5 and 7; leather 8, shoulders under the thumb and covers most of the ball of said member, see Fig. 3. Where shank of 5, terminates over the back of the hand, it is riveted to leather 8, by three rivets 6, Fig. 2. The leather cushion 8, terminates in three adjusting and binding straps which are fastened by adjusting devices, we prefer buckles 9, Figs. 1 and 2, to wrist band 11, which is fastened and adjusted by buckle 10, around wrist.

Figure 4 shows a variation in the detailed construction of the device,—however identical as to general construction, position worn on hand and use; in Fig. 4, prongs 1 and 2, have a common base terminating in a short shank 5—A; said 5—A, fastened to combination metal cushion and shank 7—A, by means of rivets, small bolts and nuts, or screws, 6—A. The use of small bolts and nuts or screws 6—A, would allow the removal of said prongs 1 and 2, for replacement or otherwise. A series of holes in 7—A, to correspond with same in 5—A, would allow prongs 1 and 2, to be adjusted in various positions to suit user,—this construction has the disadvantage of the liability of working loose.

Leather 8 could be riveted to the wrist band 11, and made in various lengths to fit different sized hands for the sake of a little more economical construction,—we prefer the adjusting feature 9, Figs. 1 and 2.

The prongs 1 and 2 could be made slightly curved to conform generally to the butt of the ear; the points of the prongs 1 and 2 thus dipping down close to the root of the shank of the ear of corn,—this is an alteration, however, which can be made by the user to suit his convenience.

Figure 3 shows how the device fits in the palm of the hand and our preferred way of using the device. The shank of 5, cushioned by 8, is held rigid when the thumb and forefinger are brought toward each other. The prongs 1 and 2 are locked still more securely by 5, 7, and 8, shouldering under the thumb. The prongs 1 and 2 fit practically in the middle of the palm of the hand and can be adjusted by the three adjusting buckles 9, to suit the convenience of the husker.

In Fig. 3, the husk is shown cut away at 12, and the shank 15 is cut to illustrate clearly how the device is used. It will be noticed that the husk 14 is fastened to the shank 15, and the said shank in turn to the butt of the ear, therefore by loosening the ear from the shank, the ear comes out clean. This our device does by direct contact,—the primary purpose of the device.

By simply grabbing the ear over the butt, as shown in Fig. 3, the prongs automatically pierce the husk, one on each side of the shank, below the base of the husk. The husk, shank, and ear are thus held firmly by a light hold with the fingers and thumb, together with the prongs 1 and 2, and the teeth 3 of the device. The husker, with the right hand, merely makes an incision in the husk, toward the tip of the ear 13, with a hook or other device known to the art, or with one of our devices on the right hand, an incision just sufficient to allow him to grab the ear,—then preferably with an easily executed, combination twisting and prying movement, against the prongs 1 and 2, and teeth 3, frees the ear from the husk and shank, and with a continuation of the same movement, throws the ear in the wagon. The device taking the brunt of the strain, instead of the hand, of holding the shank and husk, as the ear is dislodged by the other hand.

The ear can be husked with the device inserted the same way, with the tip of the ear pointed up and away from the husker, instead of down as shown in Fig. 3. Also the long prong 1 can be used to tear open the husk, as indicated before, by a forward encircling movement, just the reverse of the movement of the hook known to the art.

We are aware that the wrist band described is not new and therefore do not claim same as our invention, but

We claim:

In a hand corn husking device, the combination of a wrist band, a flexible strap connected at both ends to said wrist band, a flat curved supporting plate mounted on said strap, a corn grasping means mounted on the supporting plate, comprising a shank portion on said plate and a forked portion extending at substantially right angles from the shank, the prongs of said forked portion being sharpened at the extremities and portions between the prongs being serrated, whereby the strap and supporting plate when mounted on the hand of the operator will pass between the thumb and index finger and the shank portion will rest against the ball of the thumb, and the prongs will extend towards the flexed fingers.

JOHN FRED KRIEGE.
EDWARD AUGUST WILKINS.